Aug. 18, 1931.  P. E. FENTON  1,819,156

SELF ADJUSTING CARPET FASTENER

Filed June 13, 1928

Inventor
Paul E. Fenton
by
Wm. H. Finckel
Attorney.

Patented Aug. 18, 1931

1,819,156

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

SELF ADJUSTING CARPET FASTENER

Application filed June 13, 1928. Serial No. 285,070.

The object of this invention is to provide a fastener to be attached to a carpet, rug or other floor covering, which is adapted to cooperate with a complemental fastening member on or in the floor to be covered, the part attached to the carpet, rug or other floor covering having a movable or floating member which is adapted to move into registering position with the complemental member in case there is variation in the distance of separation between the carpet element and the floor element.

The invention consists of an attaching base carrying its own means for securing it to a carpet, rug or other floor covering, and sustaining in a movable manner a fastener element adapted for cooperation with a complemental fastener element on or in the floor, the fastener element which is attached to the floor covering, being self-adjusting so as to register with the said complemental fastener element, as I will proceed now to explain more fully and finally claim.

Figure 1:
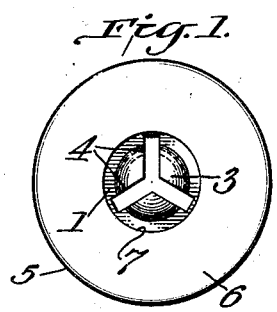
Figure 2:
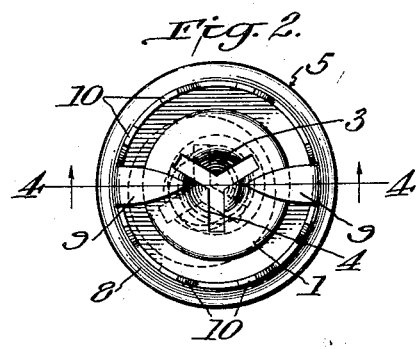
Figure 3:
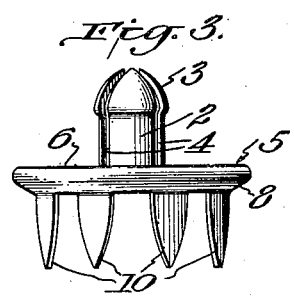
Figure 4:
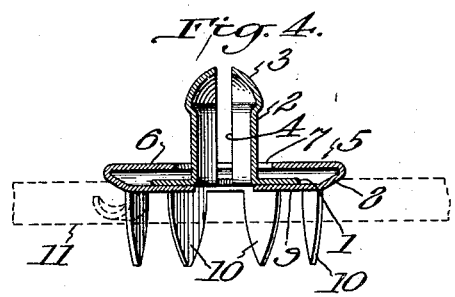
Figure 5:
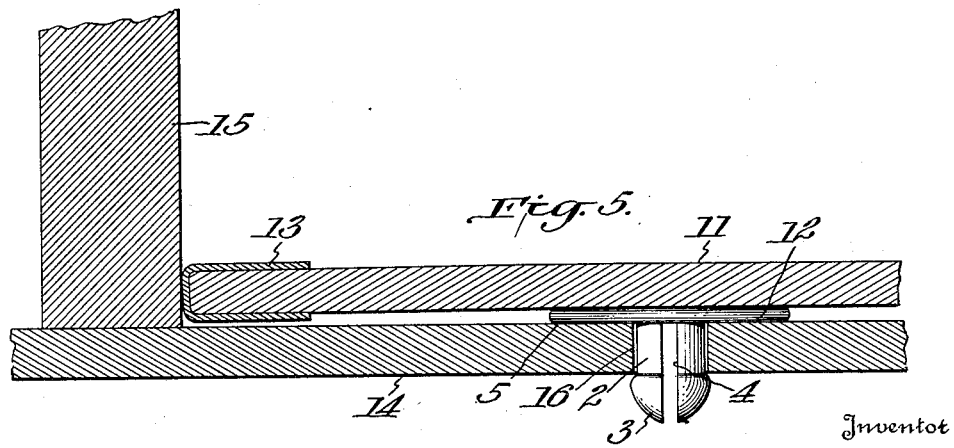

In the accompanying drawings illustrating the invention, in the several figures of which like parts are similarly designated, Figure 1 is a top plan view; Fig. 2 is a bottom plan view; Fig. 3 is an elevation, and Fig. 4 is a vertical section illustrating one form of the invention. Fig. 5 is a conventional vertical section of part of the floor and the back of a seat of an automobile and a portion of a carpet or rug to which is attached a fastener element, which is shown in elevation in engagement with a hole in the floor, which hole serves the purpose of a snap fastener element complemental to the snap fastener element on the carpet.

The invention is illustrated as embodying a resilient head or stud member of a snap fastener. This head or stud comprises a bottom flange 1, from which rises the shank 2 terminating in a laterally extended conoidal head 3, the shank and head being slitted longitudinally, as at 4, the slits extending only partway into the flange, as indicated in Figs. 1 and 2, so that the head or stud becomes a resilient member which contracts to permit it to pass into a complemental snap fastener member and then expands so as to engage said complemental member.

The head or stud is combined with a base 5, the face 6 of which is provided with an opening 7 of greater diameter than the larger diameter of the head 3 and of smaller diameter than flange 1, so that the head or stud may have movement laterally in every direction in said base in order to become self-adjusting relatively to the complemental socket member.

The base 5 has a rim 8, extending from its periphery and turned inwardly therefrom and underneath the face, and its greater portion spaced apart from the face 6 of the base sufficiently to permit the self-adjustment of the head or stud. The rim 8 at its inner margin is provided with the prongs 9 and 10, the prongs 9 being bent toward the head or stud so as to engage the flange 1 and support the head or stud in the base and admit of its freedom of movement thereon, as indicated in Figs. 2 and 4, and the prongs 10 being driven into the carpet, rug or other floor covering 11 from its back, as indicated by the dotted lines, Fig. 4, and the cross-section, Fig. 5. As indicated by the upcurved dotted lines, Fig. 4, at the left, the prongs 10 are adapted to be set by an implement or machine which will curl them upwardly through the back structure of the carpet rug or other floor covering with their points vertically concealed in the face portion of said carpet, rug or other floor covering.

Referring to Figs. 4 and 5, as already stated, 11 indicates a portion of a carpet, rug or other floor covering, to which is attached the fastener element of Figs. 1 to 4, said element being indicated in Fig. 5, by the numeral 12. The carpet, rug or other floor covering is shown as having a binding strip 13 around one or more of its edges. 14 indicates part of a floor of an automobile body, and 15 indicates part of the back of a seat.

The present day practice in the manufacture of automobile bodies, provides for metal floors, and obviously it would be difficult to secure a snap fastener element to such floor in a stable manner, and therefore in order to supply such complemental members of a snap fastener, I provide the floor at intervals with vertically extending holes 16, of a diameter sufficient to permit the passage of the head or stud when in contracted condition, and its outer edge to be engaged by the head 3 when in expanded or normal condition.

It may readily happen that there is a variance in the spacing of the floor holes and the snap fastener elements on the carpet, rug or other floor covering, with the result that if the fastener element on the carpet, rug or other floor covering is stationary and immovable, there would be a misfit and a wrinkled or uneven condition of the carpet, which would be not only unsightly, but more or less annoying to the occupant of the automobile. In order to take care of this variance, the fastener head or stud, as already indicated, has sufficient play in its attaching base to provide for its self-adjustment with relation to the complemental fastener element in the floor, so that notwithstanding the above-mentioned variance, the carpet, rug or other floor covering may be laid on the floor and attached to it unwrinkled and in a perfectly flat and even condition.

It is noted that the complemental fastener element is simply a hole drilled in the metal floor. A certain amount of movement or floating of the stud is necessary in order to make it possible to introduce the stud into the hole in the floor, and inasmuch as the location of the fastener element on the carpet might not be exactly correct to register with the hole in the floor, such movability takes care of any such variance and renders the device self-adjusting.

In prior constructions in which the floating element was supported in a casing by ears extending inwardly from the edge of an annular wall which is normal to the casing, said inwardly extending retaining ears when exposed to force, as of a person treading on the fastener when applied to a carpet, will be bent against the base or flange of the floating element thereby preventing the floating of said element in the casing, whereas in my construction this liability is obviated by the relatively large area of the inturned rim bearing against the carpet and the elimination of a wall or flange standing off normal to the base, which flange has a tendency to cut into the carpet. The broad surface of the inturned rim in my invention presents a relatively flat contact with the carpet and so avoids the recited evil results of being stepped upon.

Variations in the details of construction are permissible within the principle of the invention and the scope of the claims following.

What I claim is:—

1. A self-adjusting carpet fastener, comprising a base having a face provided with an opening of larger diameter than the head of the after-mentioned stud and of smaller diameter than that of the flange of said stud, said face having a rim turned inwardly from the periphery of the face and underneath the face and its greater portion spaced from it sufficiently to permit the self-adjustment of the stud to compensate for local variance between the stud and its socket, the said inwardly turned rim presenting a broad surface to contact with the carpet and the inner margin of said rim having prongs some of which are turned inwardly in a direction parallel with and beneath the flange of the stud to support the stud in the base without liability to distortion and without binding the stud against freedom of lateral movement as pressure is applied to the fastener, the other prongs being anchored in the carpet to secure the fastener thereto, and a stud having a head extending outside of the base through the opening therein and a flange placed in said base and supported therein by said inwardly turned prongs and laterally movable in said base.

2. A self-adjusting carpet fastener, comprising a base having a face provided with an opening of larger diameter than the head of the after-mentioned stud and of smaller diameter than that of the flange of said stud, said face having a rim turned inwardly at a slant from the periphery of the face and underneath the face and its greater portion spaced from it sufficiently to permit the self-adjustment of the stud to compensate for local variance between the stud and its socket, the said inwardly turned rim presenting a broad back surface to contact with the back of the carpet and the inner margin of said rim having prongs some of which are turned inwardly in a direction parallel with and beneath the flange of the stud to support the stud in the base, the other prongs being anchored in the carpet to secure the fastener thereto, and a stud having a head extending outside of the base through the opening therein and a flange placed in said base and supported therein by said inwardly turned prongs and laterally movable in said base, the inwardly turned rim serving to defend the fastener from distortion in use and the binding of the stud against freedom of lateral movement in its base.

In testimony whereof I have hereunto set my hand this 12th day of June, A. D. 1928.

PAUL E. FENTON.